United States Patent
Anandhan et al.

(10) Patent No.: US 10,267,282 B2
(45) Date of Patent: Apr. 23, 2019

(54) PRESSURE RELIEF VALVE SYSTEMS

(71) Applicant: General Electric Company, Schenectady, NY (US)

(72) Inventors: Muthu Mailvaganan Anandhan, Lawrence Park, PA (US); Pradheepram Ottikkutti, Lawrence Park, PA (US); Shawn Michael Gallagher, Lawrence Park, PA (US); Paul Lloyd Flynn, Lawrence Park, PA (US)

(73) Assignee: GE Global Sourcing LLC, Norwalk, CT (US)

( * ) Notice: Subject to any disclaimer, the term of this patent is extended or adjusted under 35 U.S.C. 154(b) by 517 days.

(21) Appl. No.: 14/747,748

(22) Filed: Jun. 23, 2015

(65) Prior Publication Data
US 2016/0076504 A1   Mar. 17, 2016

Related U.S. Application Data

(60) Provisional application No. 62/049,776, filed on Sep. 12, 2014.

(51) Int. Cl.
*F02M 63/00* (2006.01)
*F02M 59/20* (2006.01)
(Continued)

(52) U.S. Cl.
CPC ...... *F02M 63/005* (2013.01); *F02M 37/0023* (2013.01); *F02M 59/20* (2013.01);
(Continued)

(58) Field of Classification Search
CPC .. F02M 37/0023; F02M 63/025; F02M 59/20; F02M 63/005; F02M 63/0225;
(Continued)

(56) References Cited

U.S. PATENT DOCUMENTS 5,711,274 A * 1/1998 Drummer ............ F02D 41/042
                                                       123/456
6,209,523 B1 * 4/2001 Lehtonen ............... F02M 53/02
                                                       123/198 D
(Continued)

FOREIGN PATENT DOCUMENTS

| DE | 19645243 A1 | 5/1998 | |
|----|----|----|----|
| EP | 1900930 A1 | 3/2008 | |
| GB | 2330871 A * | 5/1999 | ............ F02M 53/02 |
| WO | 2008016435 A1 | 2/2008 | |
| WO | 2013093179 A1 | 6/2013 | |

OTHER PUBLICATIONS

PCT Search Report and Written Opinion issued in connection with corresponding Application No. PCT/US2015/047842 dated Nov. 11, 2015.

*Primary Examiner* — Sizo B Vilakazi
(74) *Attorney, Agent, or Firm* — McCoy Russell LLP

(57) ABSTRACT

Various methods and systems are provided for a pressure relief valve of a fuel system. In one example, a valve includes a first chamber in fluid communication with a first fuel line, a second chamber in fluid communication with a second fuel line and in fluid communication with a fuel storage tank, a piston separating the first chamber from the second chamber, and a needle coupled to the piston and controlling a flow passage between the second fuel line and the second chamber, where the piston and needle are sized such that a force applied on the piston by the first chamber parallel to an axis of movement of the piston maintains the needle in a closed position when the first fuel line flows fuel at a first pressure and the second fuel line flows fuel at a second pressure, the second pressure greater than the first pressure.

18 Claims, 4 Drawing Sheets

(51) Int. Cl.
| | |
|---|---|
| *F02M 63/02* | (2006.01) |
| *F16K 17/04* | (2006.01) |
| *F16K 31/122* | (2006.01) |
| *F02M 37/00* | (2006.01) |
| *F16K 31/163* | (2006.01) |

(52) U.S. Cl.
 CPC .... *F02M 63/0028* (2013.01); *F02M 63/0052* (2013.01); *F02M 63/025* (2013.01); *F02M 63/0225* (2013.01); *F16K 17/04* (2013.01); *F16K 31/1223* (2013.01); *F16K 31/163* (2013.01)

(58) Field of Classification Search
 CPC ........... F02M 63/0052; F02M 63/0028; F02M 63/0245; F02M 63/024; F16K 17/04; F16K 31/1223; F16K 31/163
 See application file for complete search history.

(56) References Cited

U.S. PATENT DOCUMENTS

| | | | |
|---|---|---|---|
| 2009/0159057 A1* | 6/2009 | Pursifull | F02M 63/0225 123/575 |
| 2013/0180607 A1* | 7/2013 | Graspeuntner | F02M 63/0028 137/540 |
| 2013/0312702 A1* | 11/2013 | Gerstner | F02M 63/0028 123/299 |

* cited by examiner

PRESSURE RELIEF VALVE SYSTEMS

CROSS REFERENCE TO RELATED APPLICATIONS

This application claims priority to U.S. Patent Application No. 62/049,776, entitled PRESSURE RELIEF VALVE SYSTEM, filed Sep. 12, 2014, which is hereby incorporated in its entirety herein by reference for all purposes.

BACKGROUND

Technical Field

Embodiments of the subject matter disclosed herein relate to a fuel system for an engine, for example.

Discussion of Art

High pressure fuel rails are typically equipped with a means of pressure relief to release pressure from the fuel rail. For example, if maintenance is to be performed on the fuel rail or other fuel system components, the pressure from the fuel rail is relieved via a pressure relief valve to prevent high pressure fuel spray from being directed onto the maintenance personnel. Some fuel rail pressure relief valves are manually operated, such that the maintenance personnel manually opens the valve prior to beginning maintenance. However, if the personnel forgets to open the valve, high pressure fuel spray may be unexpectedly released during maintenance. Other fuel rail pressure relief valves may be automatically opened at engine shutdown, via a solenoid valve under control of a controller, for example. Such valves are costly and complicated to control. Further, if the engine experiences an emergency shut-down, electrical energy used to open the valve may not be available. Yet another type of valve may energize the injectors in short pulses to bleed fuel pressure internally through the injector; however, this type of valve also requires electrical energy.

BRIEF DESCRIPTION

In one embodiment, a valve comprises a first chamber in fluid communication with a first fuel line, a second chamber in fluid communication with a second fuel line and in fluid communication with a fuel storage tank, a piston separating the first chamber from the second chamber, and a needle coupled to the piston and controlling a flow passage between the second fuel line and the second chamber, where the piston and needle are sized such that a force applied on the piston by the first chamber parallel to an axis of movement of the piston maintains the needle in a closed position when the first fuel line flows fuel at a first pressure and the second fuel line flows fuel at a second pressure, the second pressure greater than the first pressure.

DETAILED DESCRIPTION

The following description relates to embodiments of a pressure relief system including a means of pressure relief. In one example, the means of pressure relief is a pressure relief valve. The valve includes a first chamber in fluid communication with a first fuel line, a second chamber in fluid communication with a second fuel line and in fluid communication with a fuel storage tank, a piston separating the first chamber from the second chamber, and a needle coupled to the piston and controlling a flow passage between the second fuel line and the second chamber, where the piston and needle are sized such that a force applied on the piston by the first chamber parallel to an axis of movement of the piston maintains the needle in a closed position when the first fuel line flows fuel at a first pressure and the second fuel line flows fuel at a second pressure, the second pressure greater than the first pressure.

Figure 1:
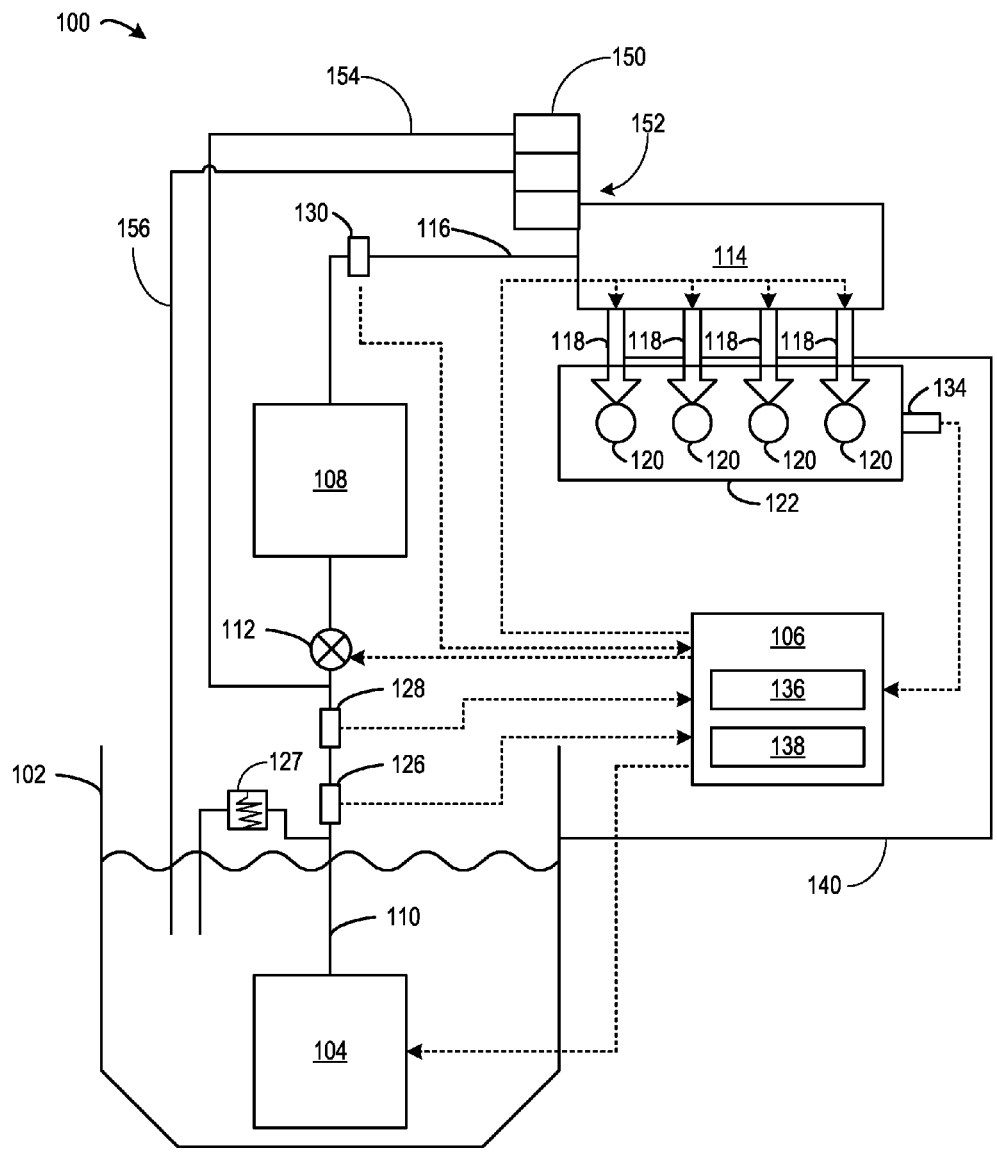
FIG. 1 shows a schematic diagram of a common fuel rail system according to an embodiment of the invention.
Figure 2:
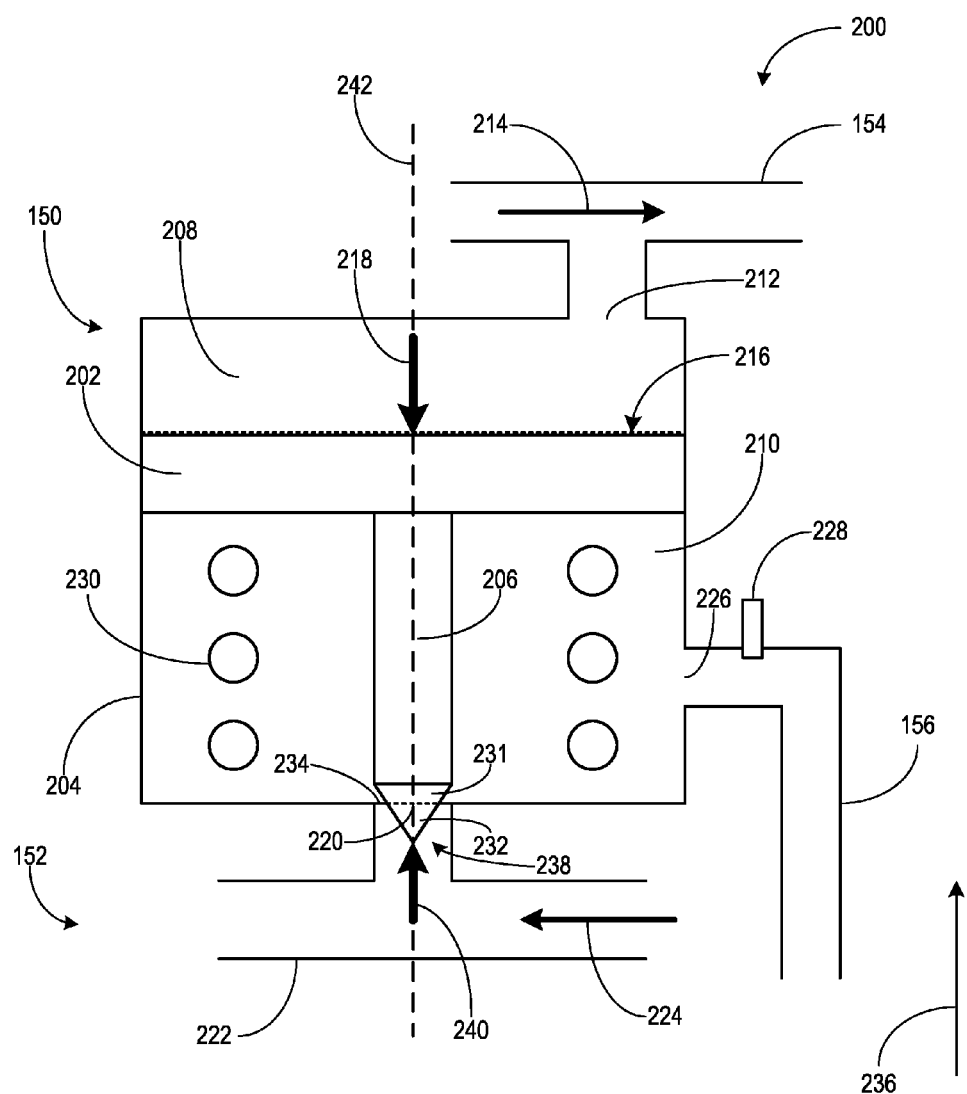
FIG. 2 shows a schematic of a pressure relief valve of a common fuel rail system in a closed position according to an embodiment of the invention.
Figure 3:
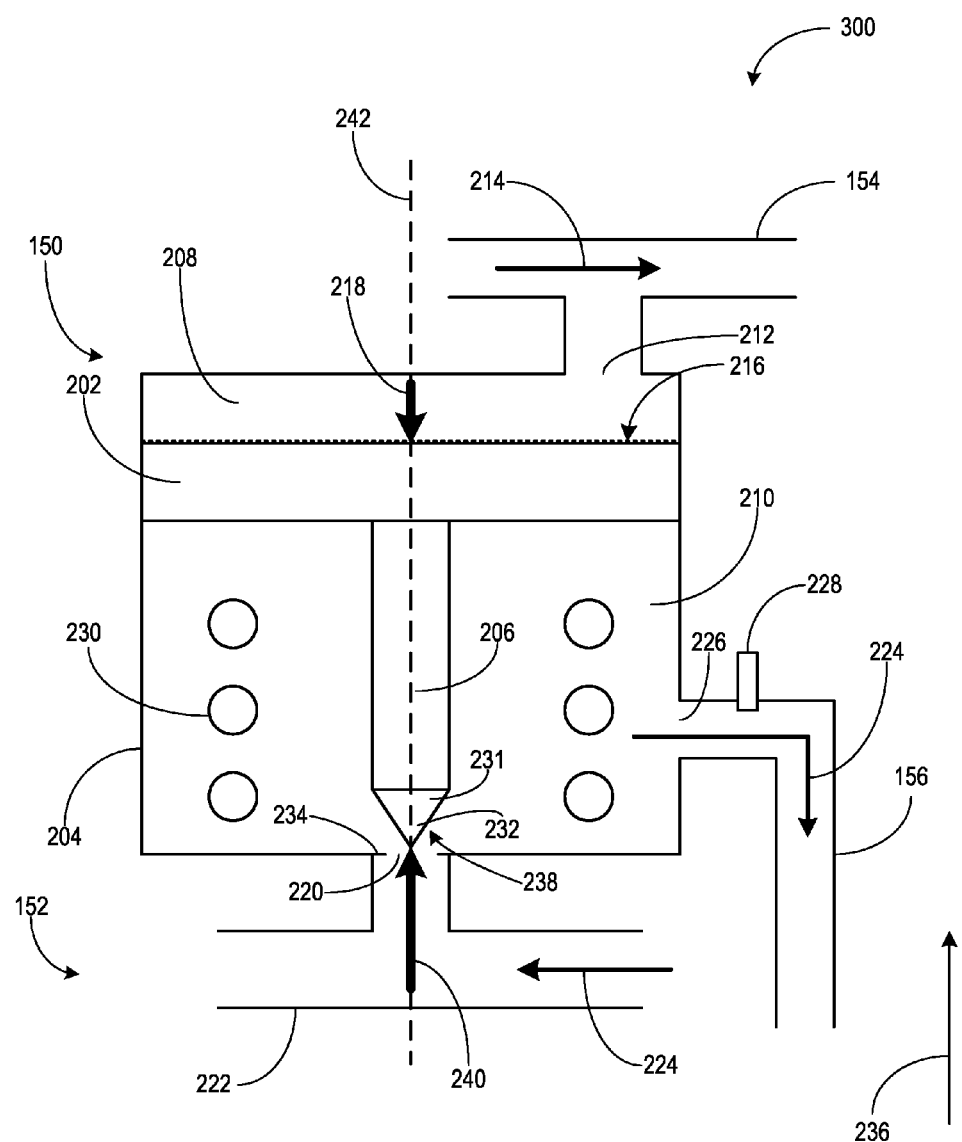
FIG. 3 shows a schematic of a pressure relief valve of a common fuel rail system in an open position according to an embodiment of the invention.
Figure 4:
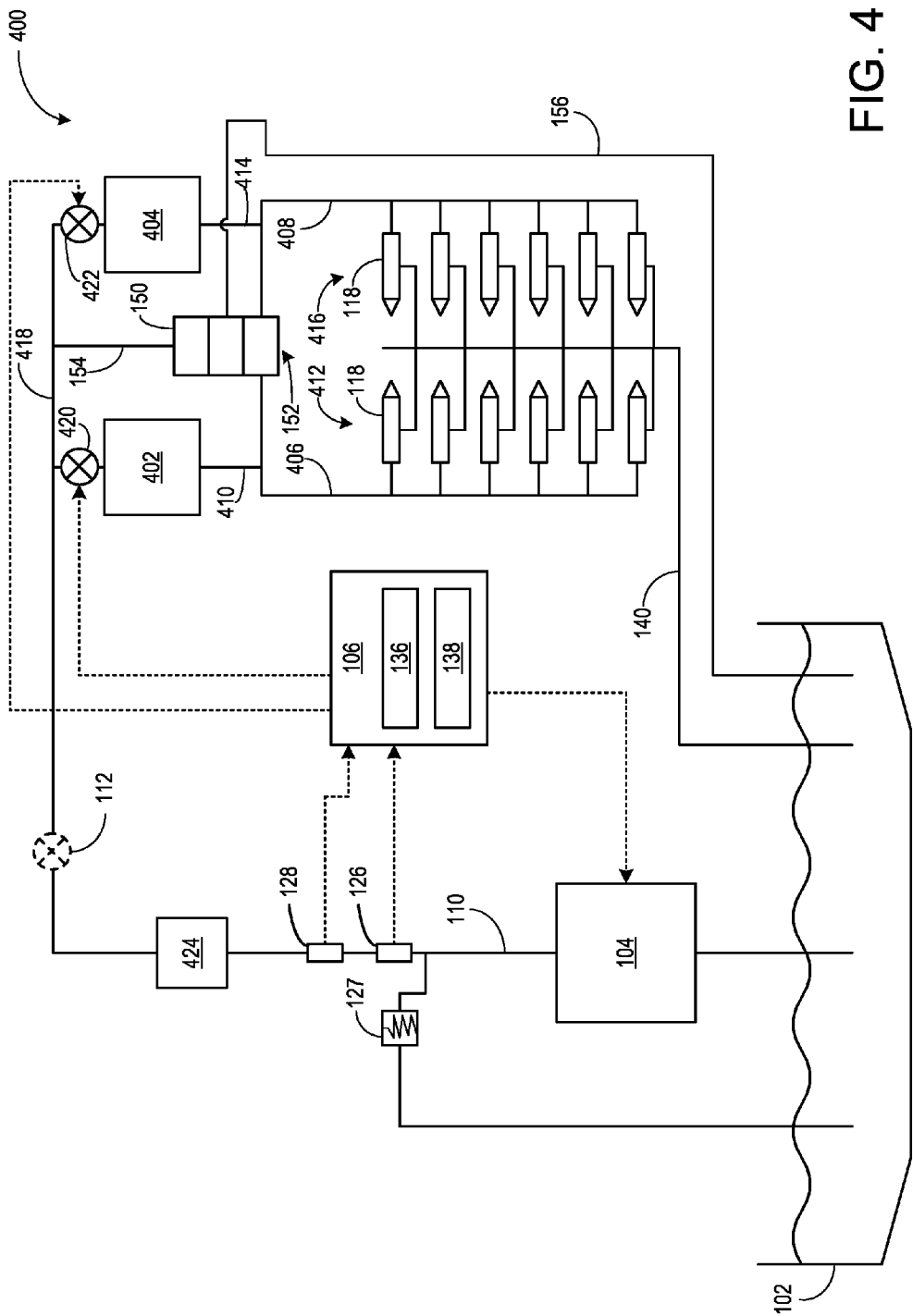
FIG. 4 shows a schematic diagram of a common fuel rail system according to another embodiment of the invention.

As one embodiment, the valve may be installed in a common fuel rail system, such as the common fuel rail system shown in FIG. 1 or FIG. 4. The first fuel line is in fluid communication with a fluid conduit coupled between a low pressure pump and a high pressure pump of the common fuel rail system. Additionally, the second fuel line is fluidly coupled to a common fuel rail (e.g., common high pressure fuel rail) of the common fuel rail system. FIG. 2 shows the valve in the closed position. When the force applied on the piston decreases below a force applied on the needle parallel to the axis of movement of the piston, the valve moves into an open position, as shown in FIG. 3. The valve may open during engine shutdown and/or when the pressure in the second fuel line increases above a threshold pressure, thereby allowing fluid in the second fuel line to drain to a fuel tank via a drain passage of the valve. In this way, fluid pressure in the second fluid line may be reduced during engine shutdown or when fuel rail pressure increases above the threshold pressure.

The approach described herein may be employed in a variety of engine types, and a variety of engine-driven systems. Some of these systems may be stationary, while others may be on semi-mobile or mobile platforms. Semi-mobile platforms may be relocated between operational periods, such as mounted on flatbed trailers. Mobile platforms include self-propelled vehicles. Such vehicles can include on-road transportation vehicles, as well as mining equipment, marine vessels, rail vehicles, and other off-highway vehicles (OHV). For clarity of illustration, a locomotive is provided as an example of a mobile platform supporting a system incorporating an embodiment of the invention.

As used herein, "high pressure" and "low pressure" are relative to one another, meaning the high pressure is a pressure higher than the low pressure, and the low pressure is a pressure lower than the high pressure. As such, a high pressure portion of a fuel system may include fuel at a higher pressure than a low pressure portion of the fuel system.

Before further discussion of a pressure relief valve for a fuel system, a first example of a fuel system for an engine is disclosed. For example, FIG. 1 shows a block diagram of a common rail fuel system (CRS) 100 for an engine of a vehicle, such as a rail vehicle. Liquid fuel is sourced or stored in a fuel tank 102 (e.g., fuel storage tank). A low pressure fuel pump 104 is in fluid communication with the fuel tank. In the embodiment shown in FIG. 1, the low pressure fuel pump is disposed inside of the fuel tank and can be immersed below the liquid fuel level. In alternative embodiments, the low-pressure fuel pump may be coupled to the outside of the fuel tank and pump fuel through a suction device. Operation of the low pressure fuel pump is regulated by a controller 106. In one embodiment, the low pressure fuel pump (e.g., low pressure pump) is a remote electric pump not driven by the engine. In some examples, the low pressure fuel pump may be referred to as a priming pump. Additionally, when power to the low pressure fuel pump is turned off, the low pressure side of the fuel system (e.g., all fluid conduits and components upstream of a high pressure fuel pump) does not hold fluid pressure and instead the pressure decreases below priming or operating pressure. In another embodiment, the low pressure fuel pump shown in FIG. 1 may be an engine driven transfer pump.

Liquid fuel is pumped by the low pressure fuel pump from the fuel tank to a high pressure fuel pump 108 through a low pressure conduit 110. The low pressure fuel pump is decoupled from the drive of the high pressure fuel pump such that the pumps may operate independently from one another (e.g., power to the low pressure fuel pump may be shut off while the high pressure fuel pump continues to operate). In an alternate embodiment, the low pressure fuel pump may be mechanically driven by the high pressure pump and thus the low pressure fuel pump may not operate independently from the high pressure fuel pump A valve 112 is disposed in the low pressure conduit and regulates fuel flow through the low pressure conduit. For example, the valve is an inlet metering valve (IMV). The IMV 112 is disposed upstream of the high pressure fuel pump to adjust a flow rate of fuel that is provided to the high pressure fuel pump and further to a common fuel rail 114 for distribution to a plurality of fuel injectors 118 for fuel injection. For example, the IMV may be a solenoid valve, opening and closing of which is regulated by the controller. In other words, the controller commands the IMV to be fully closed, fully open, or a position in between fully closed and fully opened in order to control fuel flow to the high pressure fuel pump to a commanded fuel flow rate. During operation of the vehicle, the IMV is adjusted to meter fuel based on operating conditions, and during at least some conditions may be at least partially open. It is to be understood that the valve is merely one example of a control device for metering fuel and any suitable control element may be employed without departing from the scope of this disclosure. For example, a position or state of the IMV may be electrically controlled by controlling an IMV electrical current. As another example, a position or state of the IMV may be mechanically controlled by controlling a servo motor that adjusts the IMV. In yet another embodiment, the CRS may not include an IMV and fuel pressure may be instead controlled on the high pressure side of the system. The low pressure conduit may also include a fuel filter (not shown in FIG. 1).

The high pressure fuel pump increases fuel pressure from a lower pressure to a higher pressure. The high-pressure fuel pump is fluidly coupled with the common fuel rail. The high-pressure fuel pump delivers fuel to the common fuel rail through a high pressure conduit 116. A plurality of fuel injectors 118 are in fluid communication with the common fuel rail. Each of the plurality of fuel injectors delivers fuel to one of a plurality of engine cylinders 120 in an engine 122. Fuel is combusted in the plurality of engine cylinders to provide power to the vehicle through an alternator and traction motors, for example. Operation of the plurality of fuel injectors is regulated by the controller. In the embodiment of FIG. 1, the engine includes four fuel injectors and four engine cylinders. In alternate embodiments, more or fewer fuel injectors and engine cylinders can be included in the engine.

Excess fuel in the fuel injectors returns to the fuel tank via a common fuel return 140. As such, the common fuel return is coupled to the fuel tank. In other embodiments, the CRS may not include a common fuel return.

Fuel pumped from the fuel tank to an inlet of the IMV by the low pressure fuel pump may operate at what is referred to as a lower fuel pressure or engine fuel pressure. Correspondingly, components of the CRS which are upstream of the high pressure fuel pump operate in the lower fuel pressure or engine fuel pressure region. On the other hand, the high pressure fuel pump may pump fuel from the lower fuel pressure to a higher fuel pressure or rail fuel pressure. Correspondingly, components of the CRS which are downstream of the high pressure fuel pump are in a higher-fuel pressure or rail fuel pressure region of the CRS.

A fuel pressure in the lower fuel pressure region is measured by a lower pressure sensor 126 that is positioned in the low pressure conduit. The lower pressure sensor sends a pressure signal to the controller. In an alternative application, the lower pressure sensor is in fluid communication with an outlet of the low pressure fuel pump. A fuel temperature in the lower fuel pressure region is measured by a temperature sensor 128 that is positioned in the lower pressure conduit. The temperature sensor sends a temperature signal to the controller. Additionally, a pressure regulator 127 may be positioned between the low pressure fuel pump and the lower pressure sensor and temperature sensor in the low pressure conduit. Said another way, the pressure regulator 127 may be coupled to the low pressure conduit and may relieve pressure in the low pressure conduit by directing fuel to the fuel tank. The pressure regulator may be a low pressure fuel regulator for maintaining a pressure in the lower pressure side of the fuel system (e.g., in the low pressure conduit and low pressure fuel line) within a set range. This may help to maintain a stable low pressure input to a low pressure side of a pressure relief valve (e.g., pressure relief valve 150), discussed further below. In another embodiment, the pressure regulator may be included in the low pressure pump.

A fuel pressure in the higher fuel pressure region is measured by a higher pressure sensor 130 that is positioned in the high pressure conduit. The higher pressure sensor sends a pressure signal to the controller. The controller uses this pressure signal to determine a rail pressure of fuel (e.g., FRP) in the common fuel rail. As such, the fuel rail pressure (FRP) is provided to the controller by the higher pressure sensor. In an alternative application, the higher pressure sensor is in fluid communication with an outlet of the high pressure fuel pump. Note that in some applications various operating parameters may be generally determined or derived indirectly in addition to or as opposed to being measured directly.

In addition to the sensors mentioned above, the controller receives various signals from a plurality of engine sensors 134 coupled to the engine that may be used for assessment of fuel control health and associated engine operation. For example, the controller receives sensor signals and then, based on these signals, determines one or more of air-fuel ratio, engine speed, engine load, engine temperature, ambient temperature, fuel value, a number of cylinders actively combusting fuel, and the like. In the illustrated implementation, the controller is a computing device, such as microcomputer that includes a processor unit 136, non-transitory computer-readable storage medium device 138, input/output ports, memory, and a data bus. The computer-readable storage medium included in the controller is programmable with computer readable data representing instructions executable by the processor for performing the control routines and methods described below as well as other variants that are not specifically listed.

The controller is operable to adjust various actuators in the CRS based on different operating parameters received or derived from different signals received from the various sensors, to dynamically assess the health of the CRS and control operation of the engine based on the assessment. For example, in an embodiment, the controller is operable to adjust fuel injection to the engine. Specifically, the controller may adjust fuel injection timing of one or more fuel injectors based on a determined injector activation time.

The CRS includes a hydraulic pressure relief valve 150 coupled between a high pressure side and low pressure side of the CRS. The high pressure side of the CRS is downstream from the high pressure fuel pump and the low pressure side of the CRS is upstream from the high pressure fuel pump. More specifically, the pressure relief valve is coupled at a first end to the low pressure conduit 110 via a low pressure fuel line 154. Thus, the fuel in the low pressure fuel line is supplied from the low pressure fuel pump. The pressure relief valve is coupled at a second end 152 to the common fuel rail 114 (e.g., high pressure fuel rail). As discussed above, the fuel in the common fuel rail is supplied from the high pressure fuel pump. In some examples, the pressure relief valve may be coupled to the common fuel rail by a connecting high pressure fuel line. In this way, the pressure relief valve is coupled between the low pressure conduit, between the low pressure and high pressure pump, and the high pressure fuel rail, downstream of the high pressure pump. The pressure relief valve is further coupled to a drain passage 156, the drain passage coupled to the fuel tank. For example, the drain passage may allow fuel to drain from the pressure relief valve and to the fuel tank. As described further below, the pressure relief valve is a single valve that is controlled passively by fluid pressures in the common fuel rail system. More specifically, the pressure relief valve opens and closes based on a fluid pressure balance between the high pressure and low pressure side of the fuel system alone. As such, no additional forces other than the low fuel pressure and the high fuel pressure (e.g., such as a spring force) act on the valve to open or close the valve.

FIG. 4 shows a second example of a fuel system for an engine that includes two banks of cylinders and two high pressure fuel rails. For example, FIG. 4 shows a block diagram of a common rail fuel system (CRS) 400 for an engine of a vehicle having two cylinder banks (e.g., such as a V-engine), such as a rail vehicle. The CRS of FIG. 4 may include similar components to those described above with reference to FIG. 1. Thus, similar components have been numbered similarly and will not be re-described below. Further, CRS 400 shown in FIG. 4 may include additional or alternative components to those shown in FIG. 4.

Liquid fuel is sourced or stored in a fuel tank 102 (e.g., fuel storage tank). A low pressure fuel pump 104 is in fluid communication with the fuel tank. In the embodiment shown in FIG. 4, the low pressure fuel pump is disposed outside of the fuel tank and pumps fuel through a suction device. Operation of the low pressure fuel pump is regulated by a controller 106 and the controller may function as described above with reference to FIG. 1. As described above, when power to the low pressure fuel pump is turned off, the low pressure side of the fuel system (e.g., all fluid conduits and components upstream of a high pressure fuel pump) does not hold fluid pressure and instead the pressure decreases below priming or operating pressure.

Liquid fuel is pumped by the low pressure fuel pump from the fuel tank to two high pressure fuel pumps through a low pressure conduit 110. Specifically, the low pressure fuel pump pumps fuel to a first high pressure fuel pump 402 coupled to a first high pressure fuel rail 406 and a second high pressure fuel pump 404 coupled to a second high pressure fuel rail 408. The first and second high pressure fuel pumps may operate similarly to the high pressure fuel pump 108 described above with reference to FIG. 1. The low pressure conduit may include a fuel filter 424. In FIG. 4, the fuel filter is shown downstream of the low pressure fuel pump; however, in alternate embodiment, the fuel filter may be disposed in an alternate location in the low pressure conduit.

The low pressure fuel pump is decoupled from the drives of the first and second high pressure fuel pumps such that the pumps may operate independently from one another (e.g., power to the low pressure fuel pump may be shut off while the first and second high pressure fuel pumps continues to operate). In an alternate embodiment, the low pressure fuel pump may be mechanically driven by one or both of the high pressure pumps and thus the low pressure fuel pump may not operate independently from the high pressure fuel pumps. As shown in FIG. 4, a first inlet metering valve 420 is coupled upstream of the first high pressure fuel pump and a second inlet metering valve 422 is coupled upstream of the second high pressure fuel pump. Thus, the low pressure conduit couples to a second low pressure conduit 418 extending between an inlet to the first inlet metering valve and an inlet to the second inlet metering valve. The first and second inlet metering valves are configured to adjust a flow rate of fuel that is provided to the first and second high pressure fuel pumps, respectively, and further to the first and second high pressure fuel rails, respectively, for distribution to a plurality of fuel injectors 118 for fuel injection.

In an alternate embodiment, a single inlet metering valve 112 may be disposed in the low pressure conduit upstream of both the first and second high pressure fuel pumps to adjust a flow rate of fuel that is provided to the first and second high pressure fuel pumps and further to the first and second high pressure fuel rails for distribution to a plurality of fuel injectors 118 for fuel injection. In another embodiment, the CRS may not include an IMV and fuel pressure may be instead controlled on the high pressure side of the system (e.g., downstream from each of the first and second high pressure fuel pumps).

The high pressure fuel pumps increases fuel pressure from a lower pressure to a higher pressure. The first high-pressure fuel pump delivers fuel to the first high pressure fuel rail through a high pressure conduit 410. A first set of fuel injectors 412 for a first bank of the engine are in fluid communication with the first high pressure fuel rail. Each of the first set of fuel injectors delivers fuel to one of a plurality of engine cylinders of a first bank of the engine (similar to the engine of FIG. 1). Operation of the first set of fuel injectors is regulated by the controller. In the embodiment of FIG. 4, the engine includes six fuel injectors and six engine cylinders on each engine bank. In alternate embodiments, more or fewer fuel injectors and engine cylinders can be included in the engine.

Similarly, the second high-pressure fuel pump delivers fuel to the second high pressure fuel rail through a high pressure conduit 414. A second set of fuel injectors 416 for a second bank of the engine are in fluid communication with the second high pressure fuel rail. Each of the second set of fuel injectors delivers fuel to one of a plurality of engine cylinders of a second bank of the engine. Operation of the second set of fuel injectors is regulated by the controller.

Excess fuel in the fuel injectors returns to the fuel tank via a common fuel return 140. As such, the common fuel return is coupled to the fuel tank. In other embodiments, the CRS may not include a common fuel return.

The CRS includes a hydraulic pressure relief valve 150 coupled between a high pressure side and low pressure side of the CRS. The high pressure side of the CRS is downstream from the first and second high pressure fuel pumps and the low pressure side of the CRS is upstream from the first and second high pressure fuel pumps. More specifically, the pressure relief valve is coupled at a first end to a second low pressure conduit 418 extending between an inlet to the first inlet metering valve and an inlet to the second inlet metering valve via a low pressure fuel line 154. Thus, the fuel in the second low pressure fuel line is supplied from the low pressure fuel pump. The pressure relief valve is coupled at a second end 152 to both the first high pressure fuel rail and the second high pressure fuel rail. As discussed above, the fuel in the first high pressure fuel rail is supplied from the first high pressure fuel pump and the fuel in the second high pressure fuel rail is supplied from the second high pressure fuel pump. In this way, the pressure relief valve is coupled between the low pressure conduit, between the low pressure and both the first and second high pressure pumps, and the first and second high pressure fuel rails, downstream of the first and second high pressure pumps. The pressure relief valve is further coupled to a drain passage 156, the drain passage coupled to the fuel tank. As described further below, the pressure relief valve is a single valve that is controlled passively by fluid pressures in the common fuel rail system. More specifically, the pressure relief valve opens and closes based on a fluid pressure balance between the high pressure and low pressure side of the fuel system alone. As such, no additional forces other than the low fuel pressure and the high fuel pressure (e.g., such as a spring force) act on the valve to open or close the valve.

FIGS. 2-3 show schematics of the pressure relief valve in further detail. Specifically, FIG. 2 shows a first schematic 200 of the pressure relief valve 150 in a closed position blocking communication between the high pressure fuel rail and the fuel tank. FIG. 3 shows a second schematic 300 of the pressure relief valve 150 in an open position coupling the high pressure fuel rail to the fuel tank via the drain passage 156 (e.g., drain conduit).

The pressure relief valve includes a movable piston 202 positioned within a valve body 204 of the pressure relief valve. A needle 206 is coupled to the piston. The pressure relief valve further includes a first chamber 208 and a second chamber 210 defined by the interior surface of the valve body and the piston. The piston completely separates the first chamber from the second chamber so that there is no fluid communication between the first chamber and the second chamber. In one example, the valve body is cylindrical and the piston has a circular cross-section fitting within the cylindrical valve body. For example, outer edges of the piston contact and slide against interior edges of the valve body. In alternate embodiments, the valve body and piston have a different shape (e.g., square or rectangular), but the piston still contacts all interior edges of the valve body in order to fluidly separate the first chamber from the second chamber.

The valve body includes a first opening 212 coupling the first chamber to the low pressure fuel line 154 (e.g., first fuel line). As such, the first opening fluidly couples the first chamber to a first fluid 214 flowing through the low pressure fuel line. As described above, the low pressure fuel line may be coupled to a low pressure conduit in the common rail system that is coupled between the low pressure and high pressure fuel pump (in the system of FIG. 1) or both high pressure pumps (in the system of FIG. 4). Thus, the first fluid may be fuel in the common rail system at a first pressure. The first pressure may be referred to herein as a pressure in the low pressure side of the common rail fuel system, $P_{LP}$. Fluid may flow freely from the low pressure fuel line into the first chamber. The piston has a piston fluid surface area 216 (e.g., surface area) exposed to the first fluid in the first chamber. More specifically, the piston fluid surface area has a first fluid frontal area defined by the geometry of the piston, the first fluid frontal area being a first fluid-exposed frontal area exposed to the first fluid. For example, if the piston is cylindrical with a circular cross-section, the first fluid frontal area is the area of the circular cross-section. The first fluid applies a first force 218, $F_{LP}$, against the piston in a direction parallel to an axis of movement of the piston (e.g., axis 242 shown in FIGS. 2-3). $F_{LP}$ may be determined by the following formula:

$$F_{LP}=P_{LP}*A_{piston},$$

where $A_{piston}$ is the first frontal area of the piston (e.g., piston surface area exposed to fuel in first chamber). Thus, as the pressure in the lower pressure side of the fuel system increases, the force applied to the surface of the piston also increases.

The valve body also includes a second opening 220 coupling the second chamber to a second fuel line (e.g., high pressure fuel line) 222. In one example, the high pressure fuel line is directly coupled to one or more high pressure fuel rails (e.g., common fuel rail 114 shown in FIG. 1 or first and second high pressure fuel rails 406 and 408 shown in FIG. 4), without any additional components between the high pressure fuel line and the fuel rail(s). In another example, the high pressure fuel line is the high pressure fuel rail such that the fuel rail is directly coupled to the second chamber via the second opening. The second opening fluidly couples the second chamber to a second fluid 224 flowing through the high pressure fuel line and the common fuel rail (or through each of the first and second high pressure fuel rails). The second fluid may be the fuel in the common rail system at a second pressure. The second pressure may be referred to herein as a pressure in the high pressure side of the common rail fuel system, $P_{HP}$.

For example, if the common rail system includes two high pressure fuel pumps and fuel rails, such as common rail system shown in FIG. 4, the second fluid may be fuel flowing through a high pressure fuel line coupled to both the first and second high pressure fuel lines. As such, the second pressure may be based on the pressure in both of the first and second high pressure fuel rails.

The valve body further includes a third opening 226 coupling the second chamber to the drain passage 156. The drain passage has a first end fluidly coupled to a side of the valve body. In other embodiments, the third opening may be positioned at a different location of the valve body, but still fluidly coupled to the second chamber (e.g., a same side as the second opening). Additionally, as shown in FIG. 1 and FIG. 4, the drain passage is coupled at a second end to the fuel tank. The drain passage includes a fuel sensor 228 that sends a signal to the controller when fuel is flowing through the drain passage and to the fuel tank. Thus, the fuel sensor may indicate when fuel is being drained from the high pressure valve and to the fuel tank.

The pressure relief valve also includes a dampening spring 230 that dampens the movement of the piston within the valve body. For example, the spring may keep the piston from moving too quickly between the open and closed positions as the first pressure and the second pressure change. Thus, the spring provides dampening only and does not open and close the valve. Additionally, the spring may maintain the valve in the open position, after it has already been opened, during an engine shutdown mode.

The needle includes a stem. The stem has a first end 231 coupled to a tapered tip 232 of the needle. An outer circumference of the first end of the stem is adapted to contact a seat 234 of the valve body (e.g., may also be referred to as a seat of the high pressure fuel line) to block flow of fuel from the high pressure fuel line into the second chamber when the needle is in the closed position, as shown in FIG. 2. The seat may define the second opening. The needle has a needle fluid surface 238 (e.g., needle surface area) exposed to the second fluid source. More specifically, the needle fluid surface has a second fluid frontal area defined by the geometry of the needle, the second fluid frontal area being a second fluid-exposed frontal area exposed to the second fluid (e.g., surface area of needle exposed to fuel in fuel passage). The second fluid frontal area is based on a fluid-exposed diameter of the needle tip and a fluid-exposed length of the needle tip. The second fluid applies a second force 240, $F_{HP}$, against the piston in a direction parallel to the axis of movement of the piston (e.g., axis 242). $F_{HP}$ may be determined by the following formula:

$$F_{HP} = P_{HP} * A_{needle},$$

where $A_{needle}$ is the first frontal area of the needle (e.g., needle surface area exposed to fuel). Thus, as the pressure in the higher pressure side of the fuel system increases, the force applied to the surface of the needle also increases.

The piston is movable vertically within the valve body with respect to a vertical axis 236. The needle is coupled to a bottom side of the piston, opposite the piston fluid surface exposed to the first fluid. Since the needle is directly coupled to the piston, without any additional components between the piston and the needle, the needle moves vertically within the valve body with vertical movement of the piston.

When the pressure relief valve is in the closed position, as shown in FIG. 2, the needle fluid surface covers the second fluid opening such that there is no fluidic communication between the second fluid opening and the drain passage. In the closed position, the needle tip is in contact with the seat and no fluid flows from the high pressure fuel line (and the common fuel rail) and into the second chamber. Said another way, the needle tip blocks fluid from entering the second chamber and flowing through the drain passage. As a result, the fluid pressure in the high pressure passage and the fuel rail may remain at a set pressure and may not be reduced.

When in the open position, as shown in FIG. 3, the needle fluid surface is positioned away from the second fluid opening such that there is fluidic communication between the high pressure fuel line (and the second opening) and the drain passage. As a result, fluid from the high pressure fuel line and fuel rail flows into the second chamber, through the third opening, and through the drain passage to the fuel tank, thereby resulting in a decrease in the second pressure ($P_{HP}$).

The position of the piston and needle within the valve body, and thus the open and closed position of the pressure relief valve, is based on the fluid forces (e.g., $F_{LP}$ and $F_{HP}$) on the piston and needle. As described above, the fluid forces are directly proportional to the respective fluid pressure and frontal area. When $F_{LP} > F_{HP}$, the pressure relief valve is closed, as shown in FIG. 2. $F_{LP}$ may be greater than $F_{HP}$ during engine priming, engine cranking and engine running (e.g., engine operation) when the rail pressure (e.g., $P_{HP}$) is below a threshold pressure. The threshold pressure may be an upper threshold at which continued operation may result in degradation of one or more system components. At engine start-up, $P_{HP}$ and $P_{LP}$ may be substantially zero. During engine priming prior to engine cranking, the high pressure pump is deactivated and the low pressure pump is operated to supply fuel at a first pressure (greater than zero) to the pressure relief valve. As $P_{LP}$ increases to the first pressure while $P_{HP}$ remains at substantially zero, $F_{LP}$ is greater than $F_{HP}$ and the pressure relief valve moves into the closed position. During engine cranking, the low pressure pump is operated to supply fuel at the first pressure (e.g., in one example, approximately 5-7 bar) and the high pressure pump is activated to supply fuel at a second pressure (e.g., approximately 700-1000 bar) to the pressure relief valve, the second pressure higher than the first pressure. However, since the piston fluid frontal area is proportionally larger than the needle frontal area, as described further below, $F_{LP}$ may remain greater than $F_{HP}$, thereby maintaining the pressure relief valve in the closed position. During engine running (e.g., engine operation), the low pressure pump is operated to supply fuel at the first pressure and the high pressure pump is operated to supply fuel at a third pressure, the third pressure higher than the first pressure and the second pressure. In one example, the third pressure is approximately 2200-2750 bar.

Conversely, when $F_{HP} > F_{LP}$, the pressure relief valve is open, as shown in FIG. 3. $F_{HP}$ may be greater than $F_{LP}$ during engine running when the rail pressure (e.g., $P_{HP}$) is greater than the threshold pressure and/or upon engine shutdown when power to the low pressure pump is turned off (e.g., during engine stop events). For example, following engine shutdown, the low pressure pump is deactivated (e.g., turned off) before the high pressure pump is deactivated. As a result, fuel from the fuel rail is supplied to the pressure relief valve while fuel from the low pressure fuel line (between the low pressure and high pressure pumps) quickly decreases to approximately zero. As a result, $F_{HP}$ increase above $F_{LP}$ and causes the pressure relief valve to open. When both $P_{HP}$ and $P_{LP}$ reach approximately zero during engine shutdown, the spring of the pressure relief valve may hold the valve in the open position. This may allow a maintenance personnel to safely work on the fuel rail system while the entire system is at a lower pressure (e.g., approximately zero bar).

As shown in FIGS. 2-3, the piston fluid frontal area is larger than the needle fluid frontal area. Since pressures in the high pressure side of the CRS may be approximately 100 times higher than the low pressure side of the CRS, the piston fluid frontal area must be larger than the needle frontal area. In some examples, the pressures in the high pressure side of the CRS may be more than 100 times higher than the low pressure side of the CRS. As a result, a smaller pressure on the low pressure side of the CRS (than on the high pressure side of the CRS) may maintain the pressure relief valve in the closed position. A geometry (e.g., size and shape) of the piston and the needle may be selected based on a pressure balance equation relating the fluid force applied to the piston, $F_{LP}$, and the fluid force applied to the needle, $F_{HP}$. A pressure balance equation for relating these two fluid forces is shown below:

$$P_{LP} * A_{piston} + M * g = 1.5 * (P_{HP} * A_{needle}) + S * L,$$

where $P_{LP}$ is the pressure of fluid in the low pressure side of the CRS (e.g., fluid pressure between the low pressure pump and the high pressure pump), $A_{piston}$ is the piston frontal area, M*g is the weight of the piston (M is the mass of the piston, g is the gravitational acceleration), 1.5 is safety factor (in other examples, may be a different number), $P_{HP}$ is the pressure of fluid in the high pressure side of the CRS (e.g., fluid pressure downstream of the high pressure pump in the common fuel rail), $A_{needle}$ is the needle frontal area, S is the spring stiffness, and L is deflection of the spring from its free state. The safety factor may be chosen based on a desired tolerance of the system. In an alternate embodiment where the valve is mounted upside down (e.g., in a reverse direction than shown in the figures), the weight of the piston may act to keep the valve in an open position when the engine is off and a spring may not be included in the valve system.

Variables M, g, S, and L are all known variables of the pressure relief valve. $P_{LP}$ and $P_{HP}$ may be measured or standard values under different operating conditions. In one example, $P_{HP}$ may be selected to be the highest acceptable pressure below the threshold pressure. Additionally, $A_{piston}$ may be limited based on the engine size and thus the size of the pressure relief valve. Thus, in one example, $A_{piston}$ may be optimized based on engine size and then the pressure balance equation may be used to determine the needle size. The needle size and piston size may be adjusted based on a producible needle size (e.g., may be chosen from a set of pre-made or pre-sized needles). In this way, the diameters and/or sizes of the needle and piston may be selected based on the other variables described above in the pressure balance equation.

As described above, the piston frontal area (e.g., cross-sectional area) is larger than the needle frontal area (e.g., cross-sectional area) due the pressure of the fluid in the low pressure side of the CRS being less than the pressure of the fluid in the high pressure side of the CRS. For example, a ratio of the fluid is the low pressure side to the fluid in the high pressure side of the CRS may be in a range of 1:100 to 1:600. Additionally, a radius of a cross-sectional area of a first end of the stem is smaller than a radius of a face of the piston.

The pressure relief valve described above may operate based on a pressure balance between a high pressure side and low pressure side of a common fuel rail system (e.g., the high pressure side downstream from one or more high pressure pumps and the low pressure side upstream from the one or more high pressure pumps and downstream from a low pressure pump). The pressure relief valve may open based on the balancing pressure under two separate engine operating conditions with different fluid pressure values. In one example, the pressure relief valve may open under a pressure-regulating mode when the fuel rail pressure (e.g., fluid pressure on the high pressure side of the CRS) increases above a threshold pressure. As a result of opening the valve, pressure in the fuel rail may be reduced; thereby reducing damage to components of the CRS due to operating at the higher pressure. In the pressure-regulating mode, the pressure relief valve opens in response to an increase in the fuel rail pressure above an upper threshold pressure, while the engine is operating and not in a shutdown mode. For example, the upper threshold pressure may be an unusually high pressure excursion of the high pressure fuel rail system. In another example, the pressure relief valve may open during an engine shutdown mode, thereby reducing the pressure in the high pressure side of the CRS. Then, during engine maintenance, maintenance personnel may safely work on the CRS without being subjected to a high pressure fuel spray. Thus, the pressure relief valve may be simply operated during two different pressure conditions during two different engine operating modes (e.g., one where the engine is operating and one where the engine is shut down). Further, the pressure relief valve may be sized (e.g., the $A_{piston}$ and $A_{needle}$) such that the valve opens under the necessary pressure conditions in both the pressure-regulating mode and the engine shutdown mode. In another embodiment, the pressure regulating valve may be sized to open under the necessary pressure conditions during just one of the pressure-regulating and engine shutdown modes.

As one embodiment, a hydraulic pressure relief valve may comprise a movable piston positioned within a valve body, the piston having a piston fluid surface exposed to a first fluid source, a needle coupled to the piston, the needle having a needle fluid surface exposed to a second fluid source, and a drain passage fluidly coupled to a side of the valve body. The hydraulic pressure relief may further comprise a first opening positioned in the valve body and fluidly coupled to the first fluid source and a second fluid opening positioned in the valve body and fluidly coupled to the second fluid source. The valve is movable between an open position and a closed position and when the valve is in the closed position, the needle fluid surface covers the second fluid opening such that there is no fluidic communication between the second fluid opening and the drain passage. Alternatively, when the valve is in the open position, the needle fluid surface is positioned away from the second fluid opening such that there is fluidic communication between the second fluid opening and the drain passage. The piston has a first fluid frontal area and the needle has a second fluid frontal area, the first fluid frontal area larger than the second fluid frontal area.

As another embodiment, a common rail system comprises a high pressure fuel rail coupled to a high pressure fuel pump, a low pressure fuel line coupled between a low pressure fuel pump and the high pressure fuel pump, and a hydraulic valve coupled between the low pressure line and the high pressure fuel rail, the hydraulic valve including a piston with a piston frontal area exposed to low pressure fluid in the low pressure fuel line and a needle coupled to the piston, the needle having a needle frontal area exposed to high pressure fluid in the high pressure fuel rail. Further, the common rail system may include a second high pressure fuel rail coupled to a second high pressure fuel pump, the low pressure fuel line also coupled between the low pressure fuel pump and the second high pressure fuel pump. The hydraulic valve may also be coupled between the low pressure line and the second high pressure fuel rail. The needle frontal area may then be exposed to high pressure fluid in a line coupled to both the first and second high pressure fuel rails.

As yet another embodiment, a method comprises during a first condition when a first fluid force applied to a first fluid-exposed surface of a movable piston of a hydraulic pressure relief valve is less than a second fluid force applied to a second fluid-exposed surface of a needle coupled to the piston, moving the hydraulic pressure relief valve coupled between a first fluid and a second fluid into an open position where the second fluid flows from a second side of the valve to a drain passage coupled to the valve. The method further comprises during a second condition when the first fluid force is greater than the second fluid force, moving the hydraulic pressure relief valve into a closed position where the there is no fluid communication between the second fluid and the drain passage. In one example, the first condition includes when a pressure of the second fluid increases above a threshold value and/or when a pump coupled to the first fluid shuts off during an engine shutdown.

In another embodiment, a valve comprises a valve body defining a first chamber and a second chamber. The first chamber is configured to be coupled in fluid communication with a first fuel line. The second chamber is configured to be coupled in fluid communication with a second fuel line and in fluid communication with a fuel storage tank. The valve further comprises a piston separating the first chamber from the second chamber, and a needle coupled to the piston. The needle is configured to control a flow passage between the second fuel line and the second chamber. The piston and needle are sized such that a force applied on the piston by the first chamber parallel to an axis of movement of the piston maintains the needle in a closed position when fuel in (or otherwise associated with) the first chamber is at a first pressure (e.g., when the first fuel line flows fuel at the first pressure) and fuel in (or otherwise associated with) the second chamber is at a second pressure (e.g., when the second fuel line flows fuel at the second pressure), the second pressure greater than the first pressure.

As still another embodiment, a valve comprises a first chamber configured for fluid communication with a first fuel line; a second chamber configured for fluid communication with a second fuel line and for fluid communication with a fuel storage tank; a piston separating the first chamber from the second chamber; and a needle coupled to the piston and configured to control a flow passage between the second fuel line and the second chamber, where the piston and needle are sized such that a force applied on the piston by the first chamber parallel to an axis of movement of the piston maintains the needle in a closed position when the first fuel line flows fuel at a first pressure and the second fuel line flows fuel at a second pressure, the second pressure greater than the first pressure.

As used herein, an element or step recited in the singular and proceeded with the word "a" or "an" should be understood as not excluding plural of said elements or steps, unless such exclusion is explicitly stated. Furthermore, references to "one embodiment" of the invention do not exclude the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
    an engine;
    a fuel rail to supply fuel to a plurality of fuel injectors of the engine;
    a high pressure fuel pump to supply fuel to the fuel rail;
    a low pressure fuel pump to supply fuel from a fuel storage tank to the high pressure fuel pump; and
    a valve fluidically coupled to the low pressure fuel pump, the fuel rail, and the fuel storage tank, the valve comprising:
        a first chamber fluidically coupled to a low pressure, first fuel line coupled to a low pressure conduit coupled to the low pressure fuel pump, the first fuel line configured to flow fuel supplied from the low pressure fuel pump;
        a second chamber fluidically coupled to a high pressure, second fuel line configured to flow fuel from the fuel rail, the second chamber additionally fluidically coupled to a drain passage in fluid communication with the fuel storage tank;
        a piston separating the first chamber from the second chamber; and
        a needle coupled to the piston and configured to control a flow passage between the second fuel line and the second chamber, where the piston and the needle are sized such that a force applied on the piston by the first chamber parallel to an axis of movement of the piston maintains the needle in a closed position when the first fuel line flows fuel at a first pressure and the second fuel line flows fuel at a second pressure, the second pressure greater than the first pressure,
        wherein the valve is configured to be in the closed position during engine operation when a pressure in the fuel rail is less than an upper threshold pressure and to automatically open during engine operation when the pressure in the fuel rail increases above the upper threshold pressure; and
        wherein, during priming prior to engine cranking, the high pressure fuel pump is deactivated and the low pressure fuel pump is operated to supply fuel at the first pressure to the valve, the fuel at the first pressure applying a force to close the valve, wherein during engine cranking, the low pressure fuel pump is operated to supply fuel at the first pressure and the high pressure fuel pump is activated to supply fuel at the second pressure to the valve, wherein during engine operation, the low pressure fuel pump is operated to supply fuel at the first pressure and the high pressure fuel pump is operated to supply fuel at a third pressure, the second pressure and the third pressure each higher than the first pressure and wherein the fuel supplied at the first pressure is supplied at a pressure in a range of 5-7 bar, the fuel supplied at the second pressure is supplied at a pressure in a range of 700-1000 bar, and the fuel supplied at the third pressure is supplied at a pressure in a range of 2200-2750 bar.

2. The system of claim 1, wherein when the needle is in the closed position, fuel in the second fuel line is blocked from the second chamber, and wherein when the needle is in an open position, fuel in the second fuel line passes through the flow passage and the second chamber and out to the fuel storage tank via the drain passage.

3. A system comprising the valve of claim 2, wherein the second fuel line is directly coupled to the fuel rail.

4. The system of claim 2, wherein a surface area of the piston exposed to fuel in the first fuel line and a surface area of the needle exposed to fuel in the second fuel line are each sized such that when fuel in the first fuel line drops below a low pressure threshold, lower than the first pressure, the needle is moved into the open position.

5. The system of claim 4, further comprising a spring in the second chamber and coupled to the piston, the spring configured to maintain the needle in the open position if the fuel in the first fuel line is below the low pressure threshold.

6. The system of claim 2, wherein a surface area of the piston exposed to fuel in the first fuel line and a surface area of the needle exposed to fuel in the second fuel line are each sized such that when fuel in the second fuel line exceeds the upper threshold pressure, higher than the second pressure, the needle moves into the open position.

7. The system of claim 1, wherein the needle comprises a stem having a first end coupled to a tapered tip, an outer circumference of the first end of the stem configured to contact a seat of the flow passage to block flow of fuel from the second fuel line into the second chamber when the needle is in the closed position.

8. The system of claim 7, wherein an area of a face of the piston is greater than a cross-sectional area of the first end of the stem.

9. The system of claim 7, wherein a radius of a cross-sectional area of the first end of the stem is smaller than a radius of a face of the piston.

10. The system of claim 1, wherein a ratio of the first pressure to the second pressure is in a range of 1:100 to 1:600.

11. A system, comprising:
an engine;
a fuel rail to supply fuel to a plurality of fuel injectors of the engine;
a high pressure fuel pump to supply fuel to the fuel rail;
a low pressure fuel pump to supply fuel from a fuel storage tank to the high pressure fuel pump; and
a pressure relief valve fluidically coupled to the low pressure fuel pump at a first chamber and to the fuel rail and the fuel storage tank at a second chamber, the pressure relief valve configured to:
be in a closed position during engine priming, engine cranking, and engine operation via the fluidic coupling between the low pressure pump and the first chamber, thereby to maintain pressure in the fuel rail, the pressure relief valve configured to be in the closed position during engine operation when a pressure in the fuel rail is less than an upper threshold pressure, and
automatically open upon engine shutdown via the fluidic coupling between the fuel rail and the second chamber, thereby to release the pressure in the fuel rail when the pressure in the fuel rail increases above the upper threshold pressure, and during priming prior to engine cranking, the high pressure fuel pump is deactivated and the low pressure fuel pump is operated to supply fuel at a first pressure to the pressure relief valve, the fuel at the first pressure applying a force to close the pressure relief valve, during engine cranking, the low pressure fuel pump is operated to supply fuel at the first pressure and the high pressure fuel pump is activated to supply fuel at a second pressure to the pressure relief valve, and during engine operation, the low pressure fuel pump is operated to supply fuel at the first pressure and the high pressure fuel pump is operated to supply fuel at a third pressure, the second pressure and the third pressure each higher than the first pressure, the fuel supplied at the first pressure is supplied at a pressure in a range of 5-7 bar, the fuel supplied at the second pressure is supplied at a pressure in a range of 700-1000 bar, and the fuel supplied at the third pressure is supplied at a pressure in a range of 2200-2750 bar.

12. The system of claim 11, wherein the high pressure fuel pump is operatively coupled to be driven by the engine, and wherein the low pressure fuel pump is operatively coupled to be driven by a motor, independent of the engine.

13. The system of claim 11, wherein the low pressure fuel pump is operatively coupled to be driven by the engine through a mechanical drive and includes a pressure regulator to maintain a constant pressure at the first chamber of the pressure relief valve.

14. The system of claim 11, wherein:
the pressure relief valve includes a piston coupled to a needle, the piston dividing the first chamber from the second chamber, the needle controlling a flow passage between the second chamber and the fuel rail, and
a surface area of the piston exposed to fuel in the first chamber and a surface area of the needle exposed to fuel in the flow passage are each sized such that the force applied by the fuel at the first pressure on the piston maintains the needle in a first position where the flow passage is blocked, to maintain the pressure relief valve in the closed position, even when the fuel at the second pressure or the third pressure is supplied to the pressure relief valve.

15. The system of claim 14, wherein following engine shutdown, the low pressure fuel pump is deactivated and the high pressure fuel pump is deactivated and fuel from the fuel rail is supplied to the pressure relief valve while fuel at the first pressure is not supplied to the pressure relief valve, thereby to cause a force applied by the fuel from the fuel rail on the needle to move the needle to a second position where fuel from the fuel rail is routed through the second chamber and to the fuel storage tank.

16. A system, comprising:
an engine;
a first fuel rail to supply fuel to a first plurality of fuel injectors of the engine and a second fuel rail to supply fuel to a second plurality of fuel injectors of the engine;
a first high pressure fuel pump to supply fuel to the first fuel rail and a second high pressure fuel pump to supply fuel to the second fuel rail;
a low pressure conduit extending between a location upstream of an inlet to the first high pressure fuel pump and a location upstream of an inlet to the second high pressure fuel pump;
a low pressure fuel pump to supply fuel from a fuel storage tank to each of the first high pressure fuel pump and the second high pressure fuel pump; and
a pressure relief valve positioned at the first and second fuel rails and comprising:
a first chamber fluidically coupled to the low pressure conduit, fuel in the low pressure conduit supplied from the low pressure fuel pump;
a second chamber fluidically coupled to each of the first fuel rail and the second fuel rail and to the fuel storage tank;
a piston separating the first chamber from the second chamber; and
a needle coupled to the piston, the needle configured to control a flow passage between the second chamber and the first and second fuel rails, where the piston and the needle are sized such that a force applied on the piston by the first chamber maintains the needle in a closed position when the low pressure fuel pump supplies fuel to the first chamber at a first pressure, even when the first and second high pressure fuel pumps supply fuel to the respective first and second fuel rails and the pressure relief valve at a second pressure that is greater than the first pressure, wherein the pressure relief valve is configured to be in the closed position during engine operation when a pressure in the first and second fuel rails is less than an upper threshold pressure and to automatically open during engine operation when the pressure in the first and second fuel rails increases above the upper threshold pressure; and wherein, during priming prior to engine cranking, the first and second high pressure fuel pumps are deactivated and the low pressure fuel pump is operated to supply fuel at the first pressure to the pressure relief valve, the fuel at the first pressure applying a force to close the pressure relief valve, wherein during engine cranking, the low pressure fuel pump is operated to supply fuel at the first pressure and the first and second high pressure fuel pumps are activated to supply fuel at the second pressure to the pressure relief valve, wherein during engine operation, the low pressure fuel pump is operated to supply fuel at the first pressure and the first and second high pressure fuel pumps are operated to supply fuel at a third pressure, the second pressure and the third pressure each higher than the first pressure and wherein the fuel supplied at the first pressure is supplied at a pressure in a range of 5-7 bar, the fuel supplied at the second pressure is supplied at a pressure in a range of 700-1000 bar, and the fuel supplied at the third pressure is supplied at a pressure in a range of 2200-2750 bar.

17. The system of claim 16, wherein the piston and the needle are further sized such that the needle is moved from the closed position to an open position, where fuel flows from the first and second fuel rails, through the second chamber, and to the fuel storage tank via a drain passage directly coupled to the second chamber, during conditions where a force applied by fuel in the flow passage on the needle is greater than a force applied by the first chamber on the piston.

18. The system of claim 17, further comprising a sensor positioned in the flow passage to detect if the pressure relief valve is open based on a flow rate of fuel in the flow passage.

* * * * *